United States Patent [19]
Stanley et al.

[11] Patent Number: 5,855,833
[45] Date of Patent: Jan. 5, 1999

[54] OBJECT EMBEDDING SYSTEM

[76] Inventors: Russell Stanley, 3018 Clinton St. South, Gulfport, Fla. 33707; Frank Miller, 3535 Stillmeadow La., Lancaster, Calif. 93536

[21] Appl. No.: 778,759

[22] Filed: Jan. 6, 1997

[51] Int. Cl.⁶ ............................................. B29C 59/00
[52] U.S. Cl. ................................. 264/129; 264/320
[58] Field of Search .................... 264/319, 320, 264/321, 322, 236, 293, 294, 296, 299; 206/557, 562, 523

[56] References Cited

U.S. PATENT DOCUMENTS

| | | | |
|---|---|---|---|
| 4,528,156 | 7/1985 | Fukuda et al. | 264/236 |
| 4,592,465 | 6/1986 | Stein | 206/83 |
| 4,763,791 | 8/1988 | Halverson | 206/570 |
| 4,964,514 | 10/1990 | Wycech | 206/564 |
| 5,320,223 | 6/1994 | Allen | 206/372 |

*Primary Examiner*—Jeffrey Stucker
*Attorney, Agent, or Firm*—Michael I. Kroll

[57] ABSTRACT

A method of manufacturing a first embedding system (10) having a first envelope (12) which is made from a first envelope skin (12A) filled with a first envelope compressionable filling (12B). The first envelope skin (12A) is abrasion resistant and has properties of being permeable on the outside and non-permeable on the inside which allows a user to press an object into the first envelope compressionable filling (12B) forming an impression therein. The user thereafter sprays a catalyst onto the first envelope skin (12A) which reacts with the first envelope compressionable filling (12B) forming a permanent impression of the object within which the object is safely stored.

3 Claims, 5 Drawing Sheets

OBJECT EMBEDDING SYSTEM

BACKGROUND OF THE INVENTION

1. Field of the Invention

The present invention relates to impressionable trays. More particularly, the present invention relates to an impressionable tray which comprises a envelope having an envelope skin within which an envelope compressionable filling is contained. When an user places a tool or sensitive electronic device upon the envelope skin and applies pressure thereon, the object forms an impression with the envelope compressionable filling.

2. Description of the Prior Art

Protective cases are well known in the art. They are configured in varying forms ranging from cut out foam filled encasements to expandable closed and/or open cell foam encasements. However, none of the prior art addresses the features of the present invention.

Numerous innovations for tool box trays have been provided in the prior art that are described as follows. Even though these innovations may be suitable for the specific individual purposes to which they address, they differ from the present invention as hereinafter contrasted.

In U.S. Pat. No. 5,320,223, Titled Insert Having Part Numbers or the like Printed at the Bottom of Retaining Recesses, invented by Phillip L. Allen, an insert for a tool box drawer or the like has a first lower layer of compressible material such as foam above which is a second upper layer of compressible material. The second upper layer of compressible material has a plurality of cut outs therein, each cut out being in the shape of the silhouette of the item or tool to be retained therein. A film of material is bonded between the first layer of compressible material and the second layer of compressible material such that the cut out portions become pockets. Labels are provided at the bottom of each pocket by printing information on either the first layer of compressible material or on the film with the printing positioned so as to be visible through the cut out portions of the upper second layer of compressible material. Where the lower layer of compressible material is non-porous, the film is not required.

In U.S. Pat. No. 4,964,514, titled Customized Plastic Tray and Method of Making Same, invented by Joseph S. Wycech, a method and apparatus is disclosed that enables a consumer to store a wide variety of items in customized storage unit. The customized storage unit consists of a plastic storage tray that has a pattern of item-receiving compartments formed therein that will correspond exactly to the shapes of items that the consumer wishes to store. The pattern is developed first reading the profiles of the items the consumer wishes to store into a computer graphics unit and arranging these stored profiles into an optimized pattern. This pattern is next sent to a computer-aided manufacturing unit that is connected to a hot wire cutter that cuts the desired pattern into a sheet of structural foam. The cut-out cores of the profiles of the items to be stored are next removed from the structural foam sheet leaving cavities within the sheet. The structural foam sheet is next placed on the lower platen of a vacuum form machine, and the cut-out cores are attached to the upper platen. A sheet of thermoplastic is heated so that it is malleable and is placed upon the structural foam sheet. A vacuum is applied to the lower platen and the upper platen is next brought downwardly into contact with the thermoplastic sheet and pushes the plastic downwardly into the cavity formed in the structural foam sheet. The upper platen is next brought back upwardly away from the thermoplastic sheet, and the thermoplastic sheet and its associated structural foam sheet are allowed to cool. When forming a compartment for a thinner item, it is not necessary to utilize the cut-out cores. The resulting product is a sturdy plastic storage tray that has an upper sheet of plastic and a lower backing unit of structural foam.

In U.S. Pat. No. 4,763,791, titled Dental Impression Supply Kit, invented by George E. Halverson and Gerald A. Nelson, a dental impression kit to assist the dentist or a dental technician in the making of dental impressions preparatory to the formation of a mold and the manufacture of a crown or full or partial dentures. The kit contains a compact and orderly arranged array of items necessary or desirable in formation of dental impression. Such items include a selection of upper and lower dental impression trays, dental impression material base and catalyst, adhesive, polish, instructions and a mixing pad. From the kit, the dentist is able to select the appropriate type and size of impression tray, mix the impression base and material on a mixing pad, prepare the tray with the adhesive and then fill it with the impression material and take the dental impression, all the while having instructions at hand if necessary. The finished dentures can be polished using the polish kit. Secondary inventory control cases complement the primary case by making inventory available as items from the primary case are depleted.

In U.S. Pat. No. 4,592,465, titled Coin Display Case, invented by Edmund W. E. Stein, a coin display case includes an outer lens, an inner lens and a central laminate. The laminate is held between the outer lens and the inner lens. The laminate further includes a hole for accepting a coin. The laminate is made out of a layer of flexible foamed material sandwiched between two layers of sulfur-free acid neutral paper.

The above patents differ from the present invention because they lack describing or claiming one or more of the following unique features of the present invention: tray side lip, tray cavity containing impression material which consists of an outer durable impression material and an inner heat liable impression material within which a tool cavity can be formed by applying pressure of a tool thereto, and/or a tray handle.

Numerous innovations for tool box trays have been provided in the prior art that are adapted to be used. Even though these innovations may be suitable for the specific individual purposes to which they address, they would not be suitable for the purposes of the present invention as heretofore described.

SUMMARY OF THE INVENTION

The present invention relates to impressionable trays. More particularly, the present invention relates to an impressionable tray which comprises a envelope having an envelope skin within which an envelope compressionable filling is contained. When an user places a tool or sensitive electronic device upon the envelope skin and applies pressure thereon, the object forms an impression with the envelope compressionable filling. The envelope compressionable filling could be foam softenable by external heat applied thereto or hardened by applying a reactive chemical thereto. The envelope compressionable filling protects the object when inserted into the object cavity. The envelope compressionable filling could also be a two part foaming kit encompassing a hardener incorporated therein. In lieu of tools, a camera can be inserted within a cavity formed therein as well as any other device or apparatus which requires protection thereof. The envelope compressionable filling could be optionally compressible such as that utilized in the florist industry. The envelope compressionable filling could also be a material which does not require heat to make it pliable and an object cavity could be formed by simply applying pressure to the object upon the envelope skin containing the envelope compressionable filling therein.

The types of problems encountered in the prior art are tools and other sensitive devices require protective packaging as well as a convenient carrying case.

In the prior art, unsuccessful attempts to solve this problem were attempted namely: foam cut outs which do not exactly encase the particular tool or other sensitive devices therein. However, the problem was solved by the present invention because it molds exactly and securely around the particular item encased therein.

Innovations within the prior art are rapidly being exploited in the field of protective means and cases having protective means.

The present invention went contrary to the teaching of the art which describes and claims trays with cut out foam inserts.

The present invention solved a long felt need for an impressionable tray having envelope compressionable filling which encases an object having pressure applied thereto.

More particularly, it is an object of the present invention to provide an impressionable tray which comprises an envelope having envelope compressionable filling therein.

In keeping with these objects, and with others which will become apparent hereinafter, one feature of the present invention resides, briefly stated, in the envelope compressionable filling being constructed from a pliable foam material wherein when a catalyst is applied thereto, the foam (and object impression) hardens to form a permanent object holding impression therein.

Another object of the invention is a reusable envelope compressionable filling which becomes pliable when heat is applied thereto and hardens when cooled. This allows the impressionable tray to be reused for different objects rather than be discarded after use.

In accordance with another feature of the present invention, the impression material comprises an envelope skin material functioning to resist abrasion thereof.

The novel features which are considered characteristic for the invention are set forth in the appended claims. The invention itself however, both as to its construction and its method of operation, together with additional objects and advantages thereof, will be best understood from the following description of the specific embodiments when read and understood in connection with the accompanying drawings.

BRIEF LIST OF REFERENCE NUMERALS UTILIZED IN THE DRAWING

First Embodiment

10—first impressionable tray (10)
12—first envelope (12)
12A—first envelope skin (12A)
12B—first envelope compressionable filling (12B)

Second Embodiment

110—second embedding system (110)
112—second envelope (112)
112A—second envelope skin (112A)
112B—second envelope compressionable filling (112B)

Common Components of Embodiments

14—ratchet (14)
14A—ratchet extension (14A)
14B—ratchet socket (14A)
16L—left user's hand (16L)
16R—right user's hand (16R)
18—electronic device (18)

First Method (210) of Making a First Embedding System (10)

212—placing (212) an object onto a top surface of a first envelope skin (12A)
214—applying (214) pressure by an user's hand onto the object until the object compresses a first envelope compressionable filling (12B) forming an object impression
216—removing (216) the object from the first envelope compressionable filling (12B)
218—spraying (218) a sufficient amount of catalyst to the top surface of a first envelope skin (12A) until saturation of the first envelope skin (12A) occurs
220—waiting (220) an ample amount of time until the catalyst reacts with the first envelope compressionable filling (12B) hardening thereof
222—placing (222) the object into the object impression Second Method (310) of Making a Second Embedding System (110)

312—heating (312) a second envelope compressionable filling (112B) until pliable
314—placing (314) an object onto a top surface of a second envelope skin (112A)
316—applying (316) pressure by an user's hand onto the object until the object compresses the pliable second envelope compressionable filling (112B) forming an object impression
318—waiting (318) an ample amount of time until the second envelope compressionable filling (112B) cools and hardens
320—removing (320) the object from the object impression to determine fitting thereof
322—placing (322) the object into the object impression

DESCRIPTION OF THE PREFERRED EMBODIMENT

Figure 1:
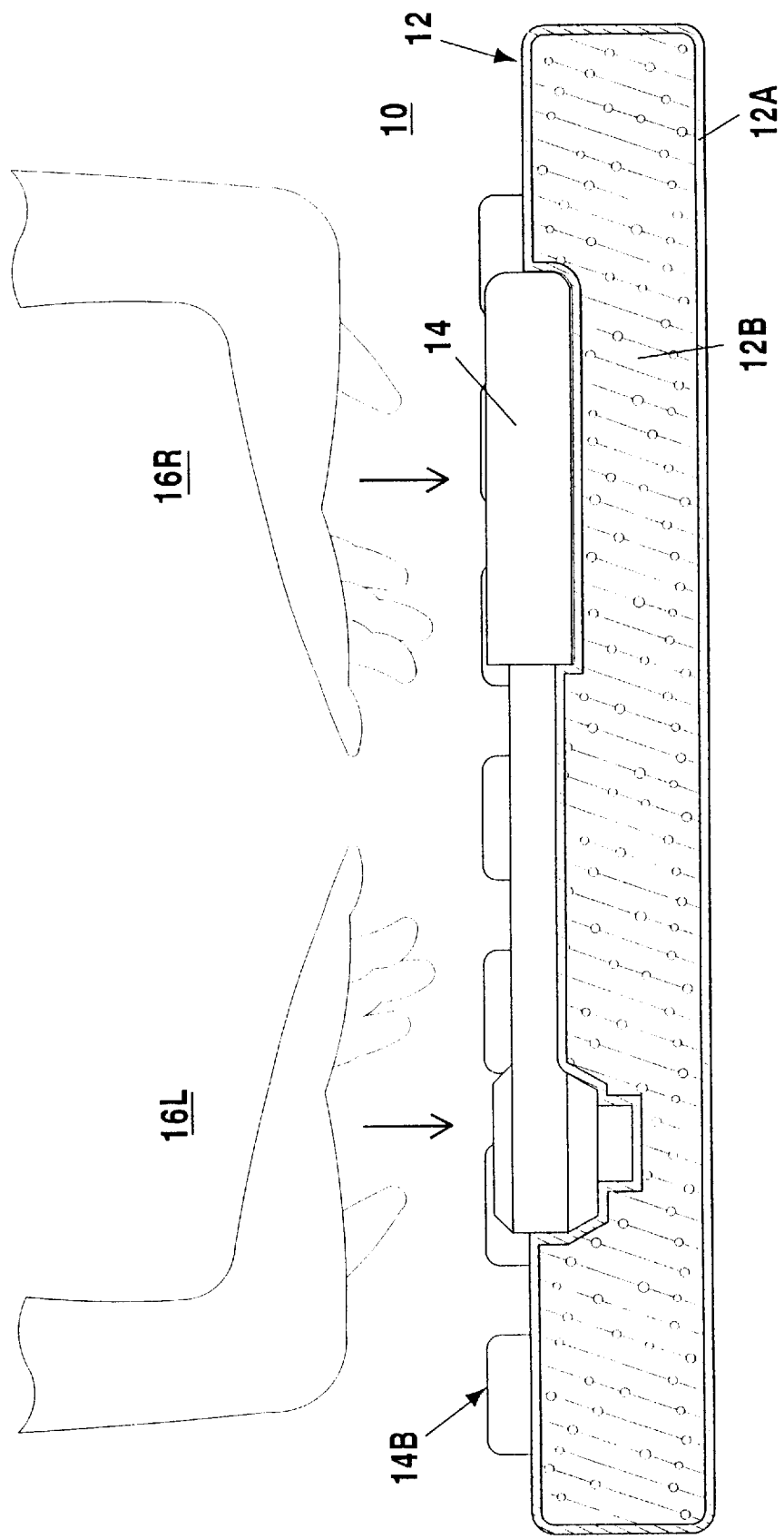
FIG. 1 is a cross sectional view of a first embedding system along line 1—1 of FIG. 2 exhibiting a left user's hand and a right user's hand applying pressure to a ratchet forming an impression within the second envelope compressionable filling.
Figure 2:
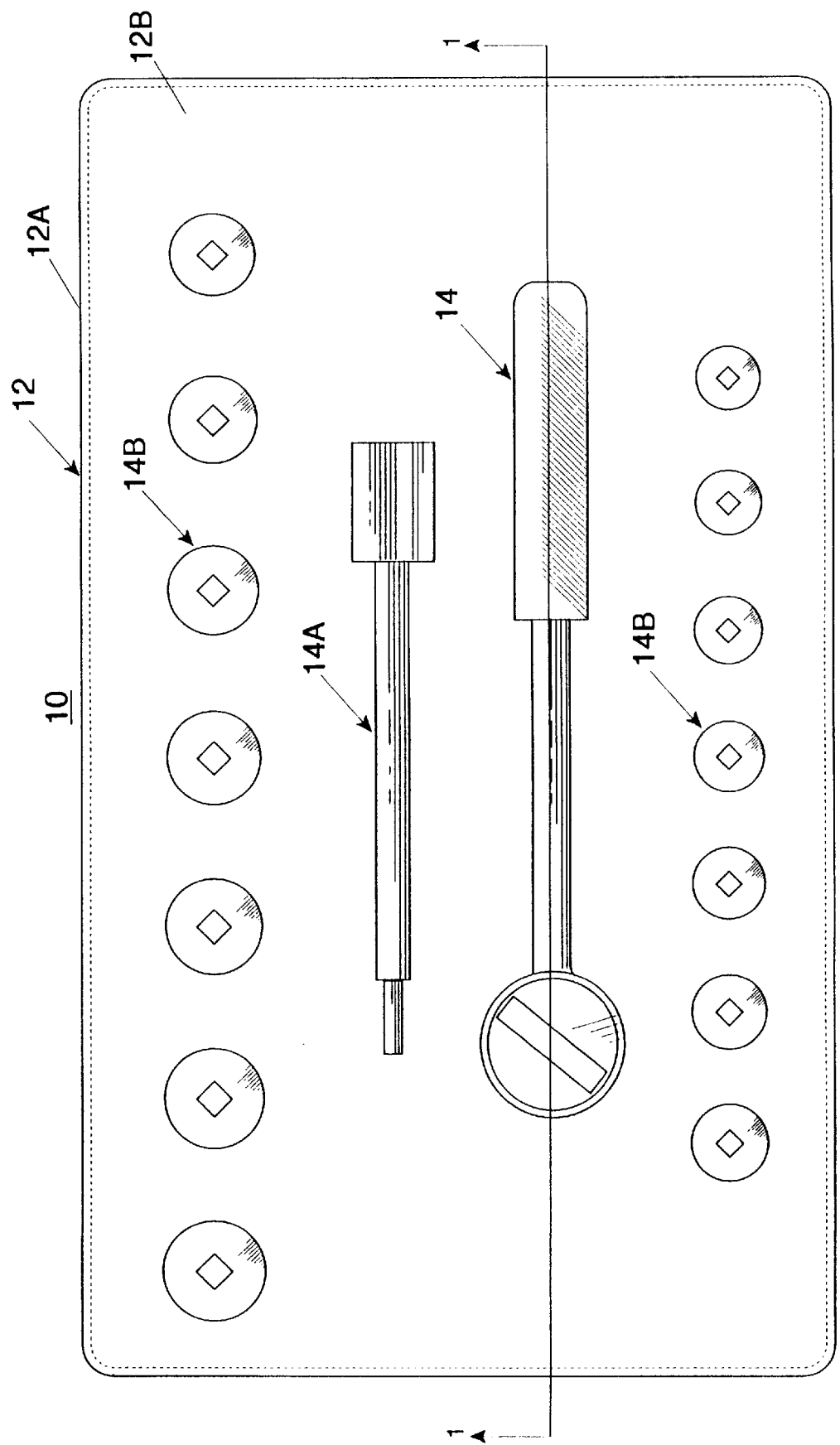
FIG. 2 is a top view of a first embedding system exhibiting a ratchet, a ratchet extension, and a plurality of ratchet sockets positioned within object cavities formed in the first envelope skin containing the first envelope compressionable filling therein.

Firstly, referring to FIG. 1 which is a cross sectional view of a first embedding system (10) along line 1—1 of FIG. 2 exhibiting a left user's hand (16L) and a right user's hand (16R) applying pressure to a ratchet (14) forming an impression within the second envelope compressionable filling (112B). The first envelope skin (12A) is constructed from a material one property which is permeability from an outside to an inside, functioning to allow the catalyst to penetrate into the first envelope compressionable filling (12B) reacting thereof. The other property of the first envelope skin (12A) is non-permeability from an inside to an outside, functioning to prevent the first envelope compressionable filling (12B) from leaking therefrom. The first envelope compressionable filling (12B) is a material selected from a group consisting of plastic, plastic composite, rubber and rubber composite. The object is selected from a group consisting of tools, sensitive electronic equipment, and sensitive devices.

Referring now to FIG. 2 which is a top view of a first embedding system (10) exhibiting a ratchet (14), a ratchet extension (14A), and a plurality of ratchet sockets (14A) positioned within object cavities formed in the first envelope skin (12A) containing the first envelope compressionable filling (12B) therein. The first embedding system (10) is selected from a group of configurations consisting of round, rectangular, triangular, oval, elliptical, and polygonal.

Figure 3:
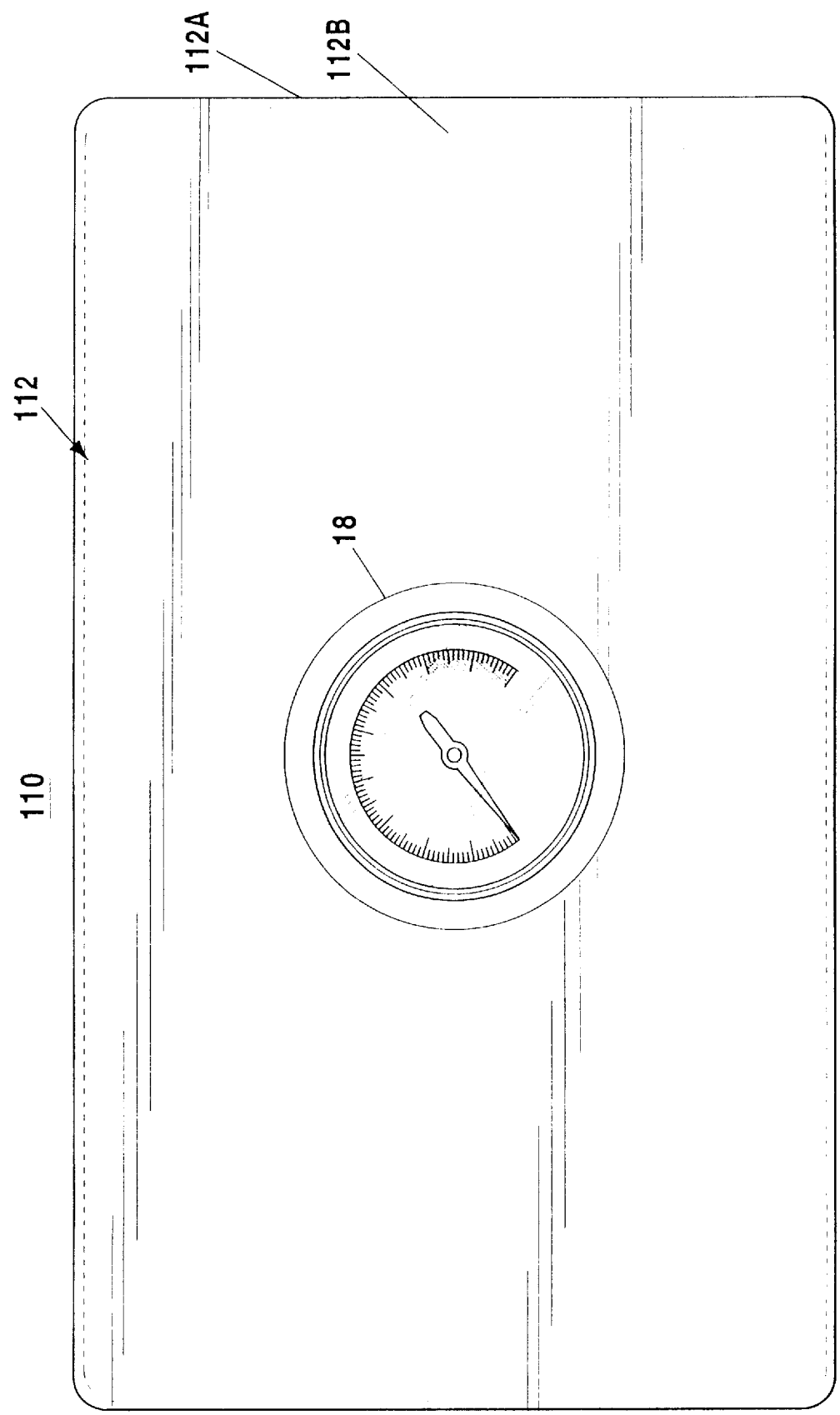
FIG. 3 is a top perspective view of a second embedding system exhibiting an electronic device positioned within an object cavities formed in the second envelope skin containing second envelope compressionable filling therein.

Now referring to FIG. 3 which is a top perspective view of a second embedding system (110) exhibiting an electronic device (18) positioned within an object cavities formed in the second envelope skin (112A) containing second envelope compressionable filling (112B) therein. The second embedding system (110) is selected from a group of configurations consisting of round, rectangular, triangular, oval, elliptical, and polygonal. The second envelope skin (112A) is constructed from a material having properties which are durability and abrasion resistance. The second envelope compressionable filling (112B) is a material selected from a group consisting of plastic, plastic composite, rubber and rubber composite. The second envelope compressionable filling (112B) has a pliability temperature point in a range from 150 degrees to 250 degrees functioning to permit an user to utilize commonly available heating devices. The commonly available heating device is preferably a hair dryer. The object is selected from a group consisting of tools, sensitive electronic equipment, and sensitive devices.

Figure 4:
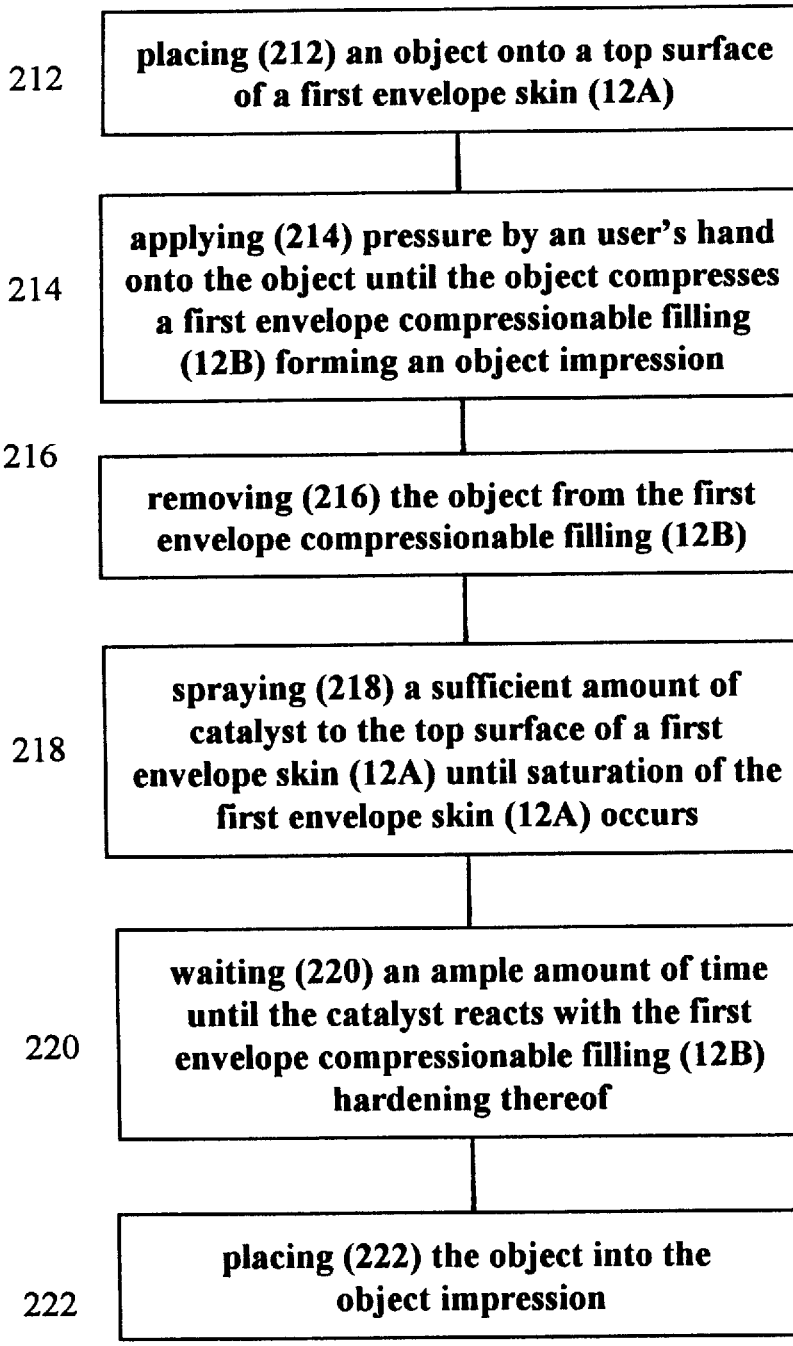
FIG. 4 is a diagrammatic representation of a first method of making a first embedding system.

Referring to FIG. 4 which is a diagrammatic representation of a first method (210) of making a first embedding system (10) consisting of the following steps:

A) placing (212) an object onto a top surface of a first envelope skin (12A);

B) applying (214) pressure by an user's hand onto the object until the object compresses a first envelope compressionable filling (12B) forming an object impression;

C) removing (216) the object from the first envelope compressionable filling (12B);

D) spraying (218) a sufficient amount of catalyst to the top surface of a first envelope skin (12A) until saturation of the first envelope skin (12A) occurs;

E) waiting (220) an ample amount of time until the catalyst reacts with the first envelope compressionable filling (12B) hardening thereof, and F) placing (222) the object into the object impression.

Figure 5:
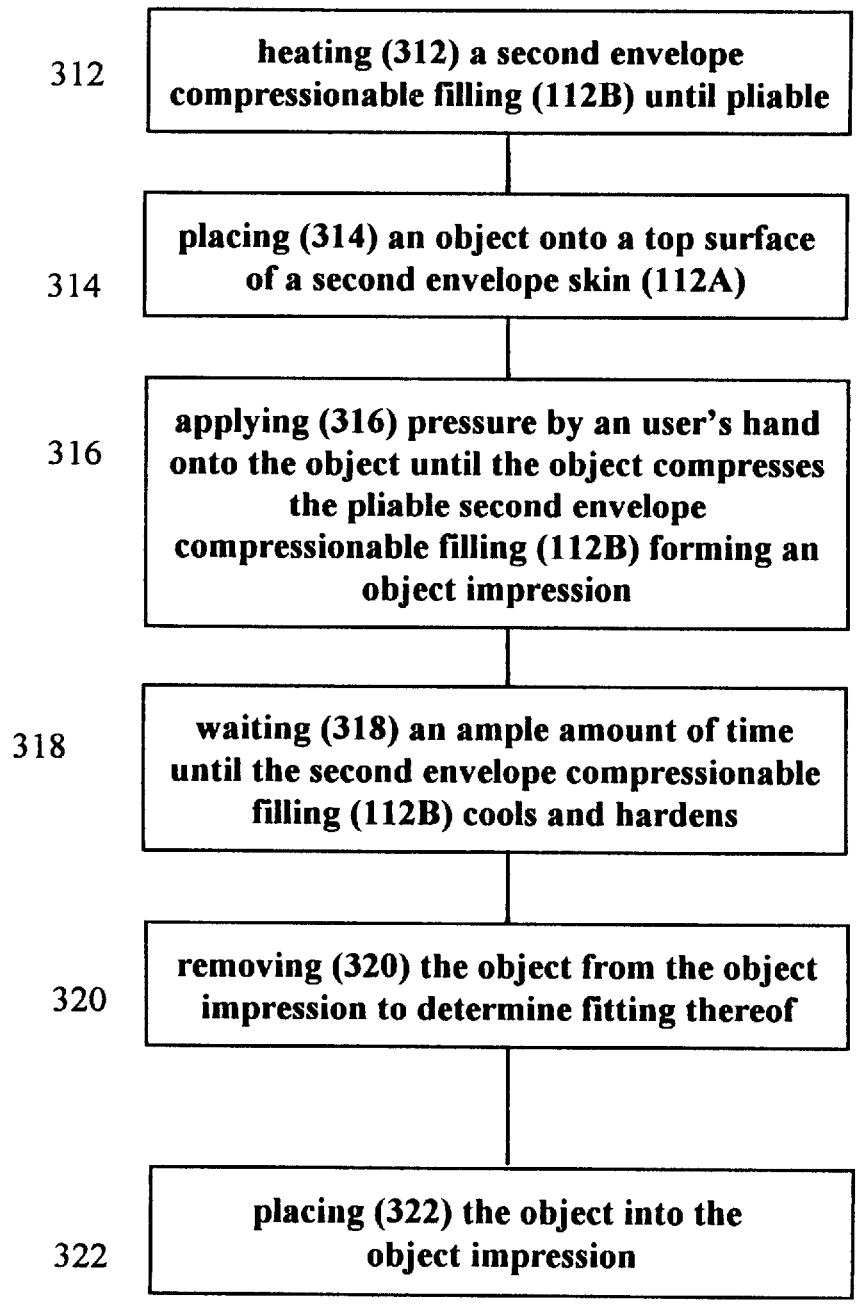
FIG. 5 is a diagrammatic representation of a second method of making a second embedding system.

Lastly, referring to FIG. 5 which is a diagrammatic representation of a second method (310) of making a second embedding system (110) consisting of the following steps:

A) heating (312) a second envelope compressionable filling (112B) until pliable;

B) placing (314) an object onto a top surface of a second envelope skin (112A);

C) applying (316) pressure by an user's hand onto the object until the object compresses the pliable second envelope compressionable filling (112B) forming an object impression;

D) waiting (318) an ample amount of time until the second envelope compressionable filling (112B) cools and hardens;

E) removing (320) the object from the object impression to determine fitting thereof; and F) placing (322) the object into the object impression.

It will be understood that each of the elements described above, or two or more together, may also find a useful application in other types of constructions differing from the type described above.

While the invention has been illustrated and described as embodied in a tool box tray, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A method of embedding an object for protective packaging comprising the steps of:

A) enclosing within an envelope skin a compressionable filling, said skin being permeable from the outside into said filling:

B) placing an object on said skin;

C) applying sufficient pressure on said object so as to form an impression of said object in said skin;

D) removing said object from said skin;

E) spraying a sufficient amount of catalyst to the outer surface of skin to saturate said skin and penetrate through said skin into said filling to effect the hardening of said filling;

F) waiting a sufficient length of time for said filling to harden leaving said impression in said skin; and G) replacing said object into said impression.

2. The method of claim 1 wherein the compressionable filling is a material selected from the group consisting of plastic, plastic composite, rubber and rubber composite.

3. The method of claim 1 wherein the object is selected from the group consisting of tools, sensitive electronic equipment, and sensitive devices.

* * * * *